(12) United States Patent
Stahlhut

(10) Patent No.: US 7,971,313 B2
(45) Date of Patent: Jul. 5, 2011

(54) WIPER ARM ASSEMBLY HAVING A LOCKING TAB

(75) Inventor: Alan J. Stahlhut, Valparaiso, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 918 days.

(21) Appl. No.: 11/926,229

(22) Filed: Oct. 29, 2007

(65) Prior Publication Data

US 2008/0313840 A1    Dec. 25, 2008

Related U.S. Application Data

(60) Provisional application No. 60/863,449, filed on Oct. 30, 2006.

(51) Int. Cl.
*B60S 1/34* (2006.01)
(52) U.S. Cl. .................. 15/250.352; 152/250.351
(58) Field of Classification Search ............ 15/250.351, 15/250.352, 250.19, 250.31, 250.21
See application file for complete search history.

(56) References Cited

U.S. PATENT DOCUMENTS

| | | |
|---|---|---|
| 3,729,767 A | 5/1973 | Edele et al. |
| 4,170,804 A | 10/1979 | Scotcher |
| 4,251,899 A | 2/1981 | Hoyler |
| 4,564,971 A | 1/1986 | Pethers et al. |
| 4,704,761 A | 11/1987 | South et al. |
| 4,741,068 A | 5/1988 | Roth |
| 4,991,251 A | 2/1991 | Egner-Walter et al. |
| 5,079,793 A | 1/1992 | Isii |
| 5,165,159 A | 11/1992 | Egner-Walter et al. |
| 5,435,042 A | 7/1995 | Arai et al. |
| 6,223,778 B1 | 5/2001 | Bucher et al. |
| 6,394,688 B1 | 5/2002 | Kraemer |
| 6,553,608 B2 | 4/2003 | Kraus et al. |
| 6,640,381 B1 | 11/2003 | Zimmer |
| 6,658,691 B2 | 12/2003 | Muramatsu |
| 6,782,581 B2 | 8/2004 | Block |
| 2003/0110587 A1 | 6/2003 | Ritt |
| 2004/0025282 A1 | 2/2004 | Zimmer et al. |

FOREIGN PATENT DOCUMENTS

| | | | |
|---|---|---|---|
| EP | 0755833 | | 1/1997 |
| JP | 63017149 | | 1/1988 |
| JP | 10129424 | | 5/1998 |
| JP | 2001001868 | * | 1/2001 |
| JP | 2001010450 | | 1/2001 |
| JP | 2001080466 | | 3/2001 |
| JP | 2004249823 | | 9/2004 |
| JP | 2005-75050 | * | 3/2005 |
| JP | 2006240364 | | 9/2006 |

* cited by examiner

*Primary Examiner* — Gary K Graham
(74) *Attorney, Agent, or Firm* — Robert L. Stearns; Dickinson Wright, PLLC

(57) ABSTRACT

A wiper arm assembly and method of construction thereof includes a mounting head and a wiper arm configured for relative rotation during assembly from a disassembled position to a shipping position, wherein the wiper arm and mounting head are locked against rotation toward the disassembled position once in the shipping position. The mounting head and wiper arm have locking surfaces configured for locked engagement with one another while in the shipping position. The locking surfaces are brought into engagement with one another by a force imparted by a spring while rotating the mounting head relative to the wiper arm from the disassembled position toward the shipping position. When in the shipping position, the locking surfaces confront each other and prevent the mounting head and the wiper arm from rotating back toward the disassembled position from the shipping position.

14 Claims, 5 Drawing Sheets

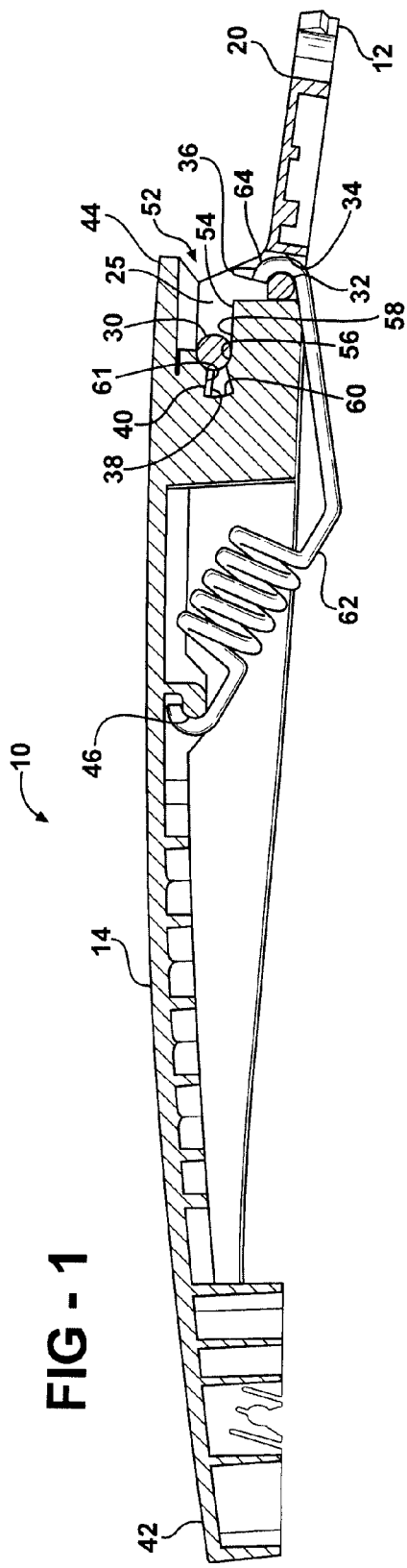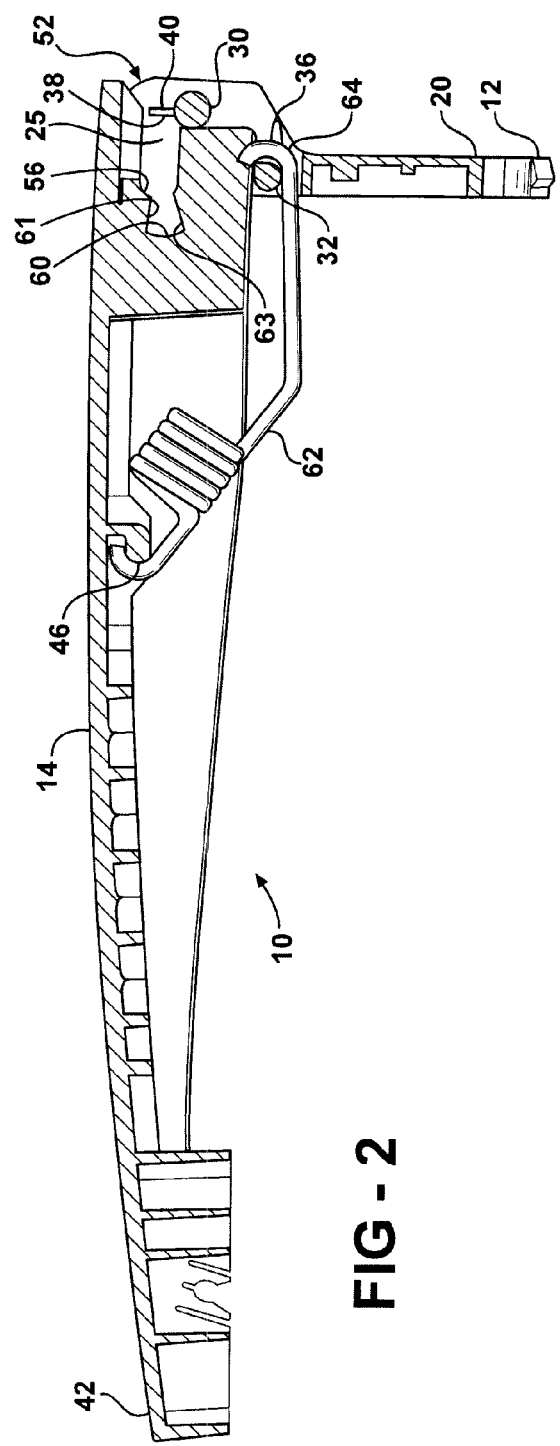

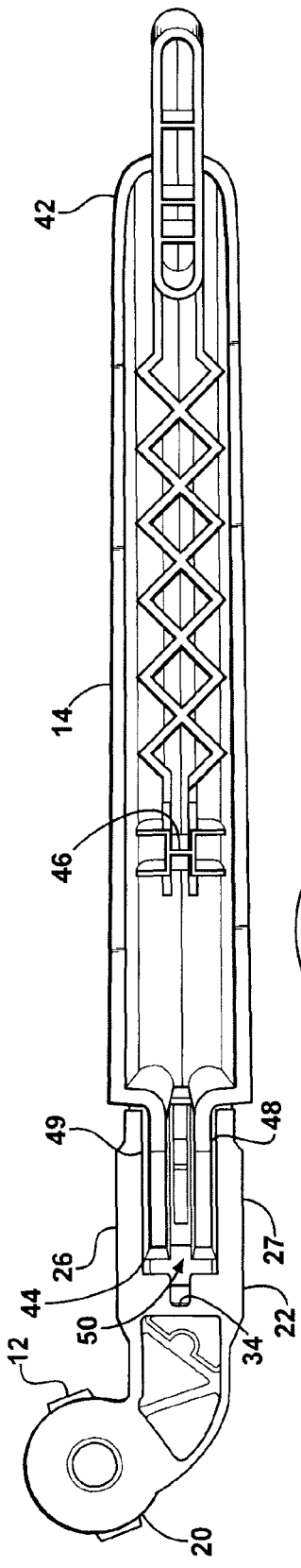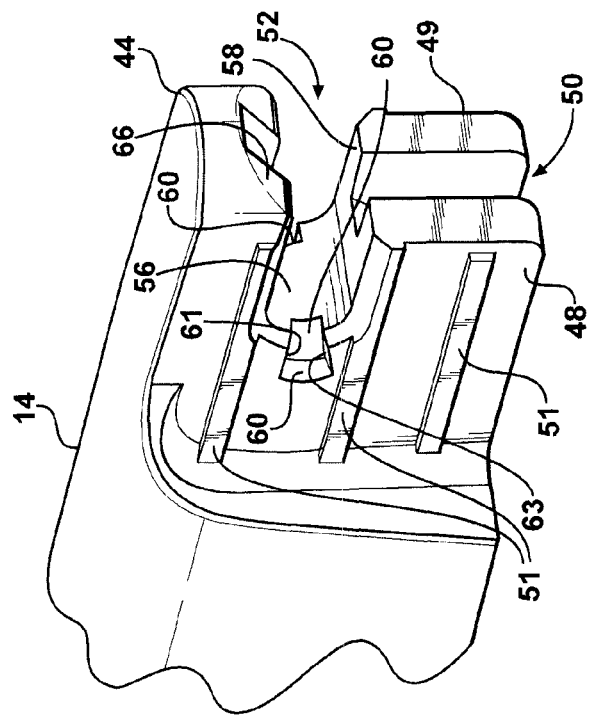

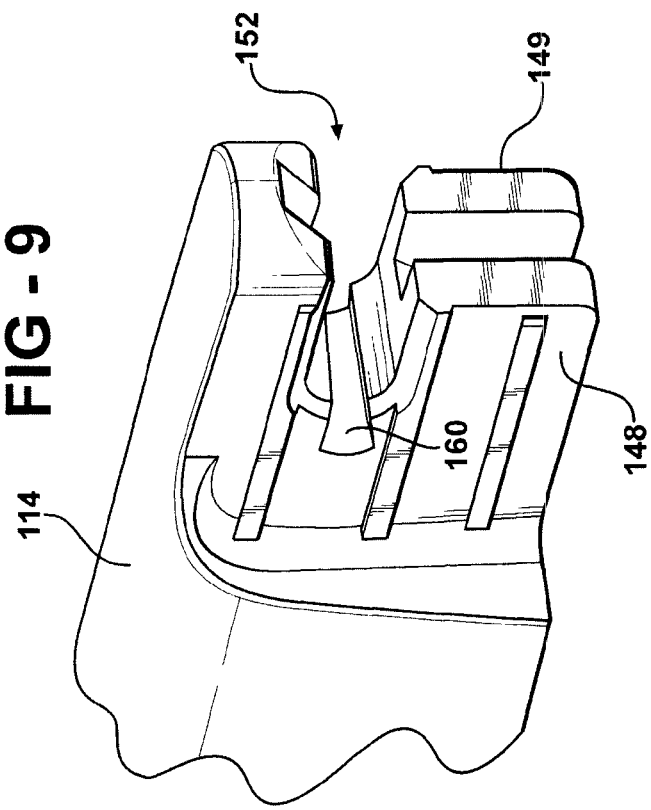
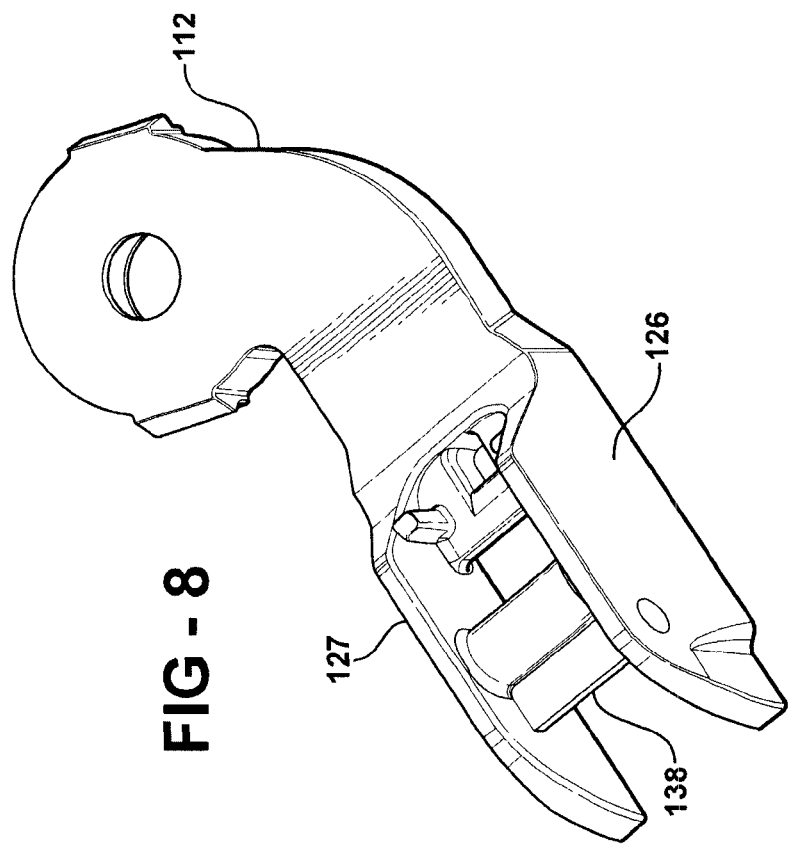

WIPER ARM ASSEMBLY HAVING A LOCKING TAB

CROSS-REFERENCE TO RELATED APPLICATION

This application claims the benefit of U.S. Provisional Application Ser. No. 60/863,449, filed Oct. 30, 2006, which is incorporated herein by reference in its entirety.

BACKGROUND OF THE INVENTION

1. Technical Field

This invention relates generally to wiper arm assemblies for vehicles, and more particularly to wiper arm assemblies having a mounting head for attachment to a vehicle and a wiper arm attached for articulation relative to the mounting head, and methods of assembly thereof.

2. Related Art

Wiper arm assemblies for vehicles are known to have a wiper arm hinged for articulation relative to a mounting head. The mounting head facilitates attachment of the assembly to a surface on the vehicle so that a wiper blade attached to the wiper arm is suitably positioned for oscillation against a window. The wiper arm and wiper blade attached thereto can generally be articulated relative to the mounting head away from the window to a service-up position to facilitate replacing the wiper blade.

It is known to manufacture wiper arm assemblies with the mounting head and wiper arm permanently fixed to one another by a staked pin or rivet. In this type of construction, the pin or rivet is assembled between axially aligned openings in the mounting head and wiper arm, and then the pin or rivet is fixed therein to permanently couple the parts together sot that they can not be taken apart thereafter. At some point in assembly, one end of a coil spring is attached to the mounting head, and an opposite end of the coil spring is attached to the wiper arm. The force imparted by the coil spring maintains the wiper blade in wiping engagement with the window as the mounting head is oscillated by a drive motor. The spring also allows the wiper arm to be articulated away from the window by manually lifting the wiper arm, such that the wiper blade can be serviced, as necessary. Though this type of wiper arm assembly works well in use, it typically comes with increased cost in manufacturing and assembly due to the added cost associated with the pin or rivet and the processes for permanently fixing the mounting head and wiper arm together.

It is also known to manufacture wiper arm assemblies with the mounting head and wiper arm attached to one another such that they can be disassembled from one another after being assembled in a "preassembled" position. A preassembled position is defined when the mounting head and wiper arm are attached together, but not yet assembled to a vehicle. In one known construction, as disclosed in the prior art section of U.S. Pat. No. 6,553,608 (the '608 patent), the mounting head and wiper arm are attached together under a preload of a tension spring, with an axle on one of the parts being received to form a hinged connection in an open hub of the other part. Bearing surfaces on the mounting head and wiper arm are pulled into engagement with one another along a line of force imparted by the tension spring. The opposing reaction forces between the bearing surfaces act to maintain the mounting head and wiper arm in the preassembled position until the wiper arm assembly is fully assembled to a vehicle. Unfortunately, the bearing surfaces are not prevented from moving back toward a disassembled direction and can slide relative to one another under a minimal force, which can occur during transport or during careless handling, whereupon the mounting head and wiper arm can become inadvertently disassembled.

To combat the problem of inadvertent disassembly set out in the prior art section of the '608 patent, the '608 patent teaches forming the bearing surfaces as being arranged to define interacting camming surfaces. In order for the mounting head and wiper arm to be disassembled from their preassembled position, the bearing surfaces require the spring attaching the mounting head and the wiper arm to be increased in length, thus requiring an increased tensile force to be overcome prior to the parts becoming disassembled from one another. Upon the bearing surfaces overcoming a cam lobe, the point at which the tensile spring is at its greatest length, the length of the spring is allowed to decrease, thereby causing a tensile force imparted by the spring to disassemble the mounting head and the wiper arm from one another. Accordingly, the '608 patent teaches that the mounting head can still be disassembled from the wiper arm by rotating the wiper arm relative to the mounting head toward the disassembled direction with a sufficient torque to overcome the cam lobe.

SUMMARY OF THE INVENTION

A wiper arm assembly includes a mounting head having one end configured for attachment to a vehicle and an opposite end. The mounting head further has one of an axle and locking tab or a hub. The locking tab has a locking surface and the hub has a pocket extending from an open end to a seating surface, with a recess extending generally from the seating surface away from the open end. The recess has a locking surface. A wiper arm of the assembly has the other of the axle and locking tab or hub. A spring is operably attached to the mounting head and the wiper arm. The assembly has a shipping position wherein the locking tab is disposed in the recess in the hub and the locking surface of the locking tab is brought into engagement with the locking surface in the recess under a force imparted by the spring when the mounting head is rotated relative to the wiper arm from a disassembled position toward the shipping position. The locking surfaces prevent the mounting head and the wiper arm from rotating back toward the disassembled position.

According to another aspect of the invention, a wiper arm assembly includes a mounting head and a wiper arm operably attached thereto. The mounting head has one end configured for attachment to a vehicle and laterally spaced sidewalls extending to another end with an axle extending laterally between the sidewalls. Further, the mounting head has a locking tab extending between the axle and the end opposite the end arranged for attachment to the vehicle, with the locking tab having a locking surface. The wiper arm has one end configured to support a wiper blade and another end configured with a hub having a pocket for rotation of the axle therein. The pocket extends generally from the one end configured to support the wiper blade to a seating surface. The hub further has a recess extending from generally from the seating surface toward the one end configured to support the wiper blade, wherein the recess has a locking surface. A spring is configured for operable attachment to the mounting head and the wiper arm. The locking tab on the mounting head is received in the recess in the hub while in a shipping position under a force imparted by the spring upon rotating the mounting head relative to the wiper arm from a disassembled position toward the shipping position. The locking surface on the locking tab confronts the locking surface in the recess while in the shipping position and prevents the mounting head and the wiper arm from rotating back toward the disassembled position from the shipping position.

According to yet another aspect of the invention, a method of constructing a wiper arm assembly is provided. The method includes providing a mounting head having one end configured for attachment to a vehicle and an opposite end. The mounting head is further provided having one of an axle and locking tab or a hub. The locking tab is provided having a locking surface and the hub with a pocket extending from an open end to a seating surface. The hub is further provided with a recess extending generally from the seating surface of the pocket away from the open end of the pocket, wherein the recess has a locking surface. The method further includes providing a wiper arm having the other of the axle and locking tab or hub, and operably attaching a spring to the mounting head and the wiper arm. Further, rotating the mounting head and the wiper arm relative to one another from a disassembled position toward a shipping position and causing the spring to initially increase in preload and the axle to be received in the hub. Then, during the rotating step, disposing the locking tab in the recess and bringing the locking surface of the locking tab into engagement with the locking surface in the recess under a force imparted by the spring during the rotating step, wherein the respective locking surfaces prevent the mounting head and the wiper arm from rotating back toward the disassembled position.

Accordingly, a wiper arm assembly constructed in accordance with the invention, by way of example and without limitation, provides a wiper arm assembly that is easy to assemble, economical in construction, prevents the assembly from becoming inadvertently disassembled, and has a long and useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a cross-sectional view taken along a line laterally offset from a central axis of a wiper arm assembly constructed according to one presently preferred embodiment of the invention while in a shipping position;

FIG. 2 is a view similar to FIG. 1 while in a disassembled position;

FIG. 5 is a bottom view of the wiper arm assembly with a spring removed;

FIG. 6 is a perspective view of a mounting head of the wiper arm assembly;

FIG. 7 is partial perspective view of the wiper arm;

FIG. 8 is a perspective view of a mounting head of a wiper arm assembly constructed in accordance with another embodiment of the invention;

FIG. 9 is a partial perspective view of a wiper arm of the wiper arm assembly of FIG. 8.

DETAILED DESCRIPTION OF PRESENTLY PREFERRED EMBODIMENTS

Figure 3:
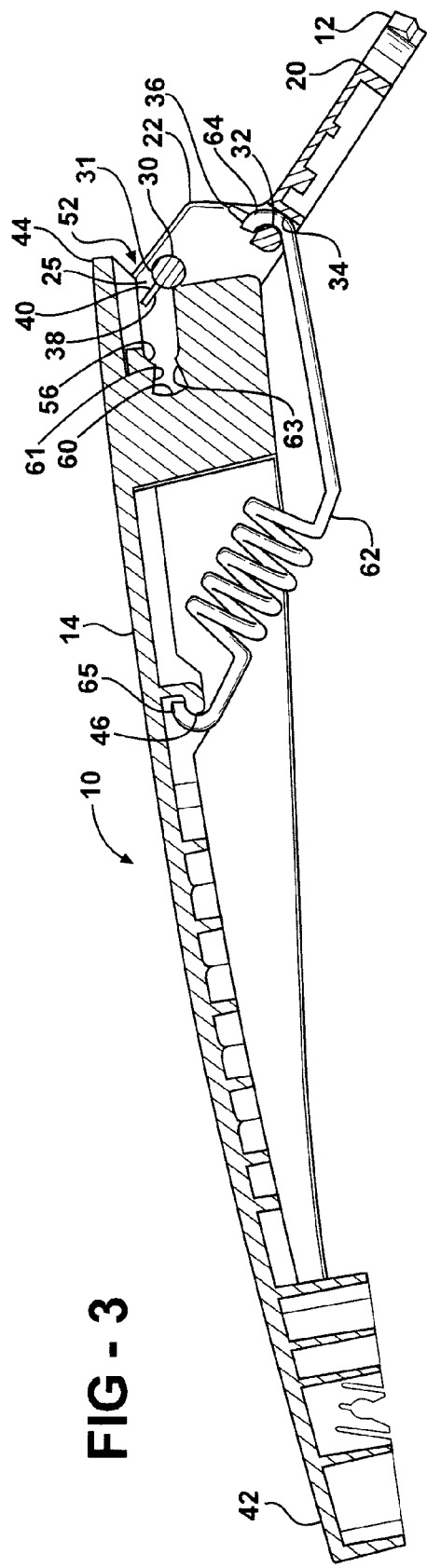
FIG. 3 is a view similar to FIG. 1 while in a partially assembled position.

Referring in more detail to the drawings, FIGS. 1-4 show a wiper arm assembly 10 constructed according to one presently preferred embodiment of the invention. The wiper arm assembly 10 has a mounting head 12 to facilitate attachment of the assembly 10 to a vehicle, and a wiper arm 14 for operable attachment of a wiper blade (not shown) to the assembly 10. The wiper arm 14 is attached for articulated movement to the mounting head 12 via a hinged joint 16 so that the wiper arm 14 can be pivoted in use and during assembly to a vehicle between a preassembled position, referred to hereafter as a shipping position (FIG. 1), and a fully assembled position (not shown), wherein the assembly 10 is mounted to a vehicle. While in the shipping position, a locking mechanism 18 acts between the mounting head 12 and wiper arm 14 to prevent them from pivoting from the shipping position back toward a disassembled position (FIG. 2). Accordingly, the wiper arm assembly 10 is prevented from becoming inadvertently disassembled, such as during shipping or while being handled prior to being attached to the vehicle.

As best shown in FIG. 6, the mounting head 12 has a mounting portion 20 and a hinge portion 22. The mounting portion 20 preferably has an opening 24 to facilitate attachment of the assembly 10 to the vehicle via a standard fastener. The hinge portion 22 is adjacent an end 25 opposite the opening 24, and is adapted to allow the wiper arm 14 to articulate relative to the mounting head 12. The mounting head 12 has a pair of laterally spaced sidewalls 26, 27 defining a generally open channel 28 therebetween. An axle 30 of a predetermined diameter extends between the sidewalls 26, 27. The axle 30 preferably defines a generally cylindrical bearing surface 31 facing the end 25 that is spaced a predetermined distance from the end 25. The mounting head 12 has a spring attachment feature, represented here, by way of example and without limitations, as a spring pin 32 extending between the sidewalls 26, 27. To further define the attachment feature, a through opening 34 is preferably formed adjacent the spring pin 32. The spring pin 32 is located generally between the axle 30 and the mounting portion 20. The mounting head 12 preferably has at least one, and shown here as a pair of stop surfaces 36 (FIGS. 1-4, and 6) arranged to limit the degree of pivot of the wiper arm 14 upwardly from the mounting head 12, from the fully assembled position while on the vehicle to the service-up position (FIG. 4). It should be recognized that the degree of movement between the assembled position and the service-up position can be varied, as desired, by altering the stop surfaces 36.

As shown in FIGS. 1-4 and 6, the locking mechanism 18 is defined in part on the mounting head 12 by at least one locking tab, and shown here as a pair of locking tabs 38. The locking tabs 38 are represented here as extending from the sidewalls 26, 27 into the open channel 28 and from the axle 30 toward the end 25 a predetermined distance. The locking tabs 38 have upper locking surfaces 40, shown here, by way of example and without limitations, as being generally flat.

As best shown in FIGS. 1-4, the wiper arm 14 has an elongate body extending between opposite ends 42, 44, with one end 42, for example, being adapted for attachment of the wiper blade, and the other end 44 being arranged for pivotal attachment to the mounting head 12. To facilitate attachment to the mounting head 12, the wiper arm 14 has a spring attachment feature, shown here as a spring hook 46, attached to a bottom surface of the wiper arm 14, and preferably formed as one piece therewith. As shown in FIGS. 5 and 7, the end 44 has a pair of sidewalls 48, 49 laterally spaced from one another by a centrally extending spring channel 50. The sidewalls 48, 49 have outer surfaces arranged for close receipt between the sidewalls 26, 27 of the mounting head 12 and within the open channel 28 of the hinge portion 22. Preferably, to minimize friction in use, the sidewalls 48, 49 have ribs 51 (FIG. 7) extending outwardly therefrom generally along their length. The end 44 has a hub 52, preferably formed as a monolithic piece of material with the wiper arm 14, although it could be formed as a separate piece and attached thereafter. The hub 52 is defined at least in part by a pocket 54 extending into the end 44 a predetermined distance to a seating surface 56. The seating surface 56 is preferably cylindrical to conform generally to the generally cylindrical bearing surface 31 on the axle 30. The pocket 54 is defined in part by opposite lower and upper walls 58, 59, respectively, preferably spaced from one another for close receipt of the axle 30, such that the axle 30 can oscillate within the pocket 54. A pair of recesses 60 extend generally from the seating surface 56 a predetermined distance away from the pocket 54 and toward the end 42 of the wiper arm 14. The recesses 60 are arranged for receipt of the locking tabs 38 and extend to an end surface 55 spaced a distance away from the seating surface 56 that is greater than the length of the locking tabs 38 to allow for generally free pivoting movement of the locking tabs 38 therein. The recesses 60 have upper locking surfaces 61 arranged for engagement with the locking surfaces 40 of the locking tabs 38, and lower surfaces 63 spaced from the upper surfaces 61 sufficiently to allow unrestricted pivoting movement of the locking tabs 38 away from the upper locking surfaces 61 while the wiper arm 14 is moved to the service-up position.

To assemble the mounting head 12 to the wiper arm 14, as spring, shown here as a coil spring 62, is tensioned between the mounting head 12 and the wiper arm 14. The coil spring 62 has hooked, generally c-shaped opposite ends 64, 65, with one end 64 being attached to the spring pin 32 of the mounting head 12 and the other end 65 being attached to the spring hook 46 of the wiper arm 14. Upon attaching the coil spring 62, the wiper arm assembly 10 is in its disassembled position (FIG. 2). While in the disassembled position, the wiper arm assembly 10 is able to readily fall apart. The axle 30 is in abutting contact with the end 44 of the wiper arm 14 adjacent the pocket 54 of the hub 52.

Figure 4:
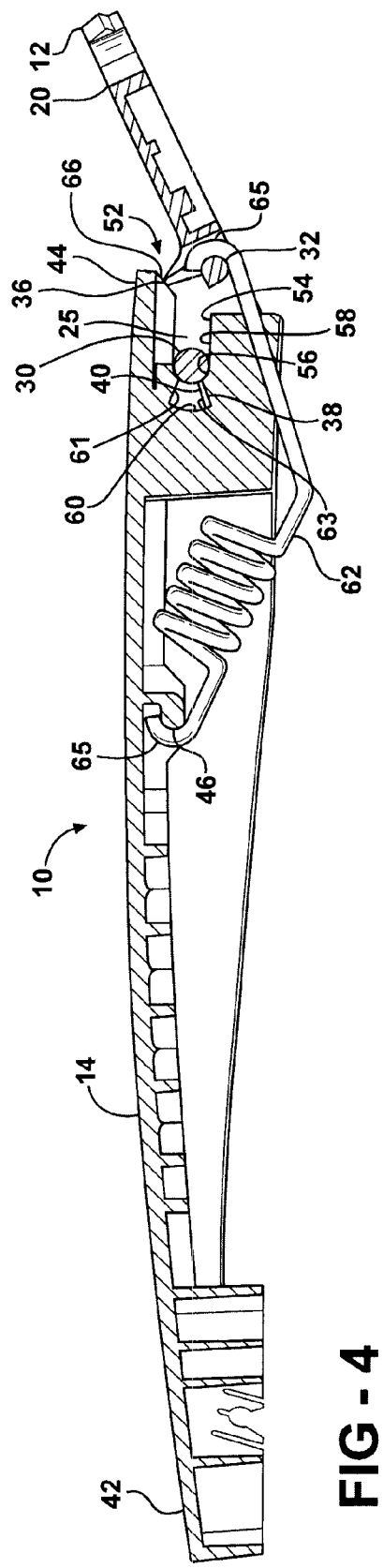
FIG. 4 is a view similar to FIG. 1 while in a service-up position.

To proceed in assembly, the mounting head 12 and wiper arm 14 are rotated relative to one another, with the mounting head 12 moving counter clockwise, as viewed in FIG. 3, wherein the mount head 12 and wiper arm 14 are shown in a partially assembled position. In this position, the axle 30 and locking tabs 38 begin to enter the pocket 54, wherein the locking tabs 38 translate and pivot conjointly with the axle 30. In the partially assembled position, the coil spring 62 is increased in length sufficiently from that of the disassembled position until the locking tabs 38 are able to be received without interference from the upper wall 59 of the hub 52. Accordingly, the mounting head 12 is rotated during assembly until the axle 30 and the locking tabs 38 are able to translate along the length of the pocket 54 under the tension imparted by the coil spring 62. As such, upon the locking tabs 38 being clear of the upper wall 59, the spring 62 pulls the axle 30 and the locking tabs 38 toward the seating surface 56, wherein the bearing surface 31 of the axle 30 engages the seating surface 56 and the locking tabs 38 are received in the recesses 60.

When the locking tabs 38 are pulled into the recesses 60 and into the shipping position, the locking surfaces 40 of the locking tabs 38 remain engaged with the locking surfaces 61 of the recesses 60 under the biasing tension of the spring 62 (FIG. 1). Accordingly, once in the shipping position, the wiper arm assembly 10 is locked against disassembly via rotation of the wiper arm 14 relative to the mounting head 12. If the assembly 10 is to be disassembled, translation of the mounting head 12 relative to the wiper arm 14 is required to clear the respective locking surfaces 61, 40 from engagement with one another. As such, a linear force sufficient to overcome the tension force imparted by the spring 62 must be applied between the mounting head 12 and the wiper arm 14 to translate the axle 30 and locking tabs 38 outwardly from the respective pocket 54 and the recesses 60. Accordingly, once in the shipping position, the wiper arm assembly 10 is locked against inadvertent disassembly.

While in the shipping position, the locking tabs 38 are spaced a predetermined distance from the lower surfaces 63 of the recesses 60. As such, the wiper arm 14 is able to be pivoted upwardly from a fully assembled position while mounted on the vehicle to the service-up position (FIG. 4). While in the service-up position, the stop surfaces 36 engage an abutment surface 66 on the wiper arm 14 to limit the pivoting movement of the wiper arm 14 relative to the mounting head 12. Accordingly, the locking tabs 38 preferably remain slightly spaced from the lower surfaces 63 of the recesses 60 while in the service-up position. Of course, if desired, the locking tabs 38 could be arranged to engage the lower surfaces 63 in lieu of the stop surfaces 36 to define the service-up position, if desired.

Figure 10:
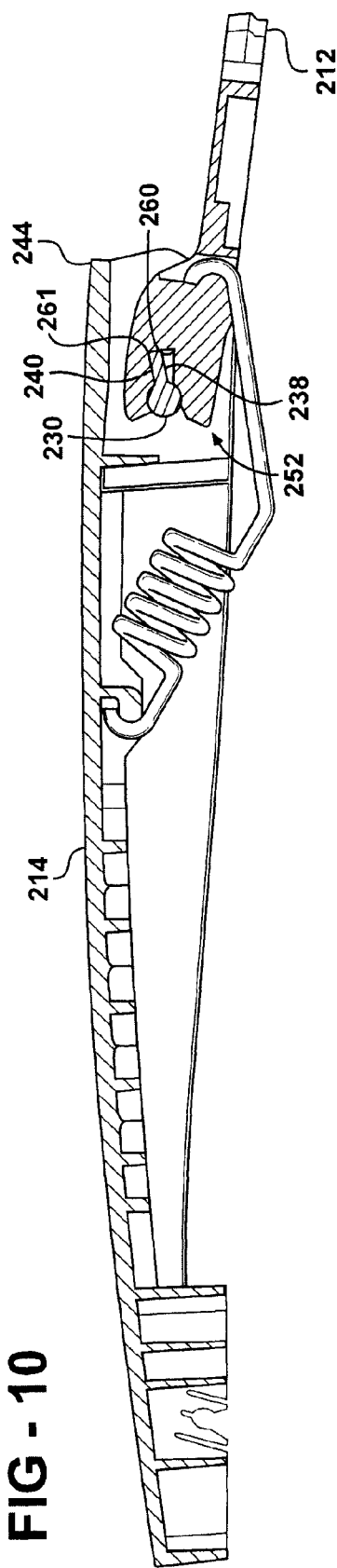
FIG. 10 is a cross-sectional view similar to FIG. 1 of a wiper arm assembly constructed in accordance with another embodiment of the invention.

Obviously, many modifications and variations of the present invention are possible in light of the above teachings. For example, as shown in FIG. 8, rather than the mounting head 12 having locking tabs 38 extending partially between the sidewalls 26, 27, a mounting head 112 could have a locking tab 138 extending completely between sidewalls 126, 127. Accordingly, as shown in FIG. 9, a corresponding wiper arm 114 would have a recess 160 extending completely between sidewalls 148, 149 of a hub 152 for receipt of the locking tab 138. Otherwise, the construction is the same. In addition, as shown in FIG. 10, a wiper arm 214 could have an axle 230 fixed thereto, with a locking tab 238 having an upper locking surface 240 extending outwardly from the axle 230 toward an end 244 of the wiper arm 214. As such, a mounting head 212 could have a hub 252 with a locking recess 260 extending therein for receipt of the locking tab 238. The recess 260 has an upper locking surface 261 for locking engagement with a locking surface 240 while in the shipping position, thereby preventing rotating movement of the wiper arm 214 and mounting head back toward the disassembled position. It is, therefore, to be understood that within the scope of the appended claims, and any other claims allowed which stem from this application, that the invention may be practiced otherwise than as specifically described and shown.

What is claimed is:

1. A wiper arm assembly, comprising:
a mounting head having one end configured for attachment to a vehicle and laterally spaced sidewalls extending to another end with an axle extending between said sidewalls, said mounting head further having a locking tab extending substantially from said axle and toward said another end, said locking tab having a locking surface;
a wiper arm having one end configured to support a wiper blade and another end configured with a hub having a pocket for rotation of said axle therein, said pocket extending generally from said another end to a seating surface, said hub further having a recess extending generally from said seating surface toward said one end, said recess having a locking surface;
a spring configured for operable attachment to said mounting head and said wiper arm; and
said locking tab on said mounting head being received in said recess in said hub in a shipping position under a force imparted by said spring upon rotating said mounting head relative to said wiper arm from a disassembled position toward said shipping position, said locking surface on said locking tab confronting said locking surface in said recess while in said shipping position and preventing said mounting head and said wiper arm from rotating back toward said disassembled position from said shipping position.

2. The wiper arm assembly of claim 1 wherein said mounting head has a pair of said locking tabs.

3. The wiper arm assembly of claim 2 wherein each of said locking tabs is attached to a separate one of said sidewalls.

4. The wiper arm assembly of claim 2 wherein said hub has a pair of said recesses, each of said recesses being arranged for receipt of a separate one of said locking tabs.

5. The wiper arm assembly of claim 1 wherein said hub has opposite sidewalls, said recess extending across said sidewalls of said hub.

6. The wiper arm assembly of claim 5 wherein said locking tab is attached to each of said sidewalls of said mounting head.

7. The wiper arm assembly of claim 6 wherein said locking tab extends continuously between said sidewalls of said mounting head.

8. The wiper arm assembly of claim 1 wherein said recess has a surface spaced sufficiently opposite said locking surface of said recess to allow said locking tab to pivot in said recess so that said wiper arm can be rotated beyond said shipping position to move said locking surface in said recess out of engagement with said locking surface on said locking tab.

9. A wiper arm assembly, comprising:
a mounting head having one end configured for attachment to a vehicle and an opposite end, said mounting head further having one of an axle with locking tab extending substantially therefrom or a hub, said locking tab having a locking surface and said hub having a pocket extending from an open end to a seating surface and a recess extending generally from said seating surface away from said open end, said recess having a locking surface;
a wiper arm having the other of said axle and locking tab or hub;
a spring operably attached to said mounting head and said wiper arm; and
said assembly having a shipping position provided by said locking tab being disposed in said recess in said hub with said locking surface of said locking tab engaging said locking surface in said recess under a force imparted by said spring upon said mounting head being rotated relative to said wiper arm from a disassembled position toward said shipping position, said locking surfaces preventing said mounting head and said wiper arm from rotating back toward said disassembled position.

10. The wiper assembly of claim 9 wherein said wiper arm has said hub and said recess extends across said seating surface.

11. The wiper assembly of claim 10 wherein said mounting head has laterally spaced sidewalls with said axle and said locking tab extending continuously between said sidewalls.

12. The wiper assembly of claim 9 wherein said wiper arm has said hub and a pair of said recesses, said recesses being laterally spaced from one another.

13. The wiper assembly of claim 12 wherein said mounting head has a pair of said locking tabs arranged for receipt in said recesses.

14. The wiper assembly of claim 13 wherein said mounting head has laterally spaced sidewalls with said axle extending between said sidewalls and said locking tabs being attached to separate one of said sidewalls.

* * * * *